United States Patent
Liss

(10) Patent No.: US 10,514,823 B1
(45) Date of Patent: Dec. 24, 2019

(54) INTERACTIVE ADVERTISING SYSTEM WITH TRACKING OF VIEWER'S ENGAGEMENT

(71) Applicant: Press Play Inc., Dallas, TX (US)

(72) Inventor: Benjamin Liss, Dallas, TX (US)

(73) Assignee: Press Play Inc., Dallas, TX (US)

( * ) Notice: Subject to any disclaimer, the term of this patent is extended or adjusted under 35 U.S.C. 154(b) by 0 days.

(21) Appl. No.: 16/221,355

(22) Filed: Dec. 14, 2018

(51) Int. Cl.
  *G06F 3/0481* (2013.01)
  *G06T 13/80* (2011.01)
  *G06F 3/0488* (2013.01)
  *A63F 13/61* (2014.01)

(52) U.S. Cl.
  CPC .......... *G06F 3/04817* (2013.01); *A63F 13/61* (2014.09); *G06F 3/04883* (2013.01); *G06T 13/80* (2013.01)

(58) Field of Classification Search
  CPC .. G06F 3/04817; G06F 3/04883; A63F 13/61; G06T 13/80
  USPC ......... 715/64, 781, 788, 799, 810, 814, 835, 715/838, 846
  See application file for complete search history.

(56) References Cited

U.S. PATENT DOCUMENTS

| | | | |
|---|---|---|---|
| 5,791,991 A * | 8/1998 | Small | A63F 3/0645 463/41 |
| 6,970,833 B1 * | 11/2005 | Fuchs | G06Q 30/02 463/41 |
| 7,690,989 B2 * | 4/2010 | Walker | A63F 13/85 463/1 |
| 8,246,466 B2 | 8/2012 | Herrmann et al. | |
| 8,313,371 B1 * | 11/2012 | Luciano, Jr. | G07F 17/32 273/138.1 |
| 8,435,119 B2 | 5/2013 | Hardy et al. | |
| 8,439,745 B2 | 5/2013 | Lind et al. | |
| 8,566,145 B2 * | 10/2013 | Dollens | G06Q 10/10 705/7.38 |
| 8,702,486 B1 | 4/2014 | Balise, III | |
| 8,732,739 B2 | 5/2014 | Silverman | |
| 8,942,994 B2 | 1/2015 | Hanina et al. | |
| 9,314,686 B2 | 4/2016 | Lockton | |
| 9,314,697 B2 * | 4/2016 | Levi | A63F 13/85 |
| 9,672,528 B2 | 6/2017 | Silverman | |
| 9,858,616 B2 | 1/2018 | Greene et al. | |
| 9,940,786 B1 | 4/2018 | Lucci | |
| 9,990,808 B2 | 6/2018 | Nordby et al. | |
| 10,074,095 B2 * | 9/2018 | Morris | G06Q 30/02 |
| 10,115,269 B2 | 10/2018 | Berman | |
| 2006/0047573 A1 | 3/2006 | Mitchell et al. | |
| 2007/0155468 A1 | 7/2007 | Olmstead et al. | |
| 2007/0244757 A1 | 10/2007 | Walter | |
| 2007/0265910 A1 | 11/2007 | Varghese | |
| 2008/0274794 A1 * | 11/2008 | Mathieson | G06Q 30/02 463/25 |

(Continued)

OTHER PUBLICATIONS

Monopoly; 1997; Parker Brothers; pp. 1-6.*

*Primary Examiner* — Andrew R Dyer
(74) *Attorney, Agent, or Firm* — Muskin and Farmer LLC

(57) ABSTRACT

A method, system, and computer readable storage to cause icons to be displayed on an electronic output device. The icons can be displayed at random times during the playback of a video or display of static content. A user's goal is to touch an icon, which can be stationary or moving on the electronic display, in order to capture that icon. Predefined combinations of icons would trigger particular prizes to be awarded.

18 Claims, 11 Drawing Sheets

(56) References Cited

U.S. PATENT DOCUMENTS

| | | | |
|---|---|---|---|
| 2009/0047641 A1* | 2/2009 | Hayes | G09B 7/02 434/159 |
| 2009/0132440 A1* | 5/2009 | Goldberg | G06Q 30/02 705/500 |
| 2009/0171787 A1* | 7/2009 | Mei | G06Q 30/02 705/14.69 |
| 2010/0304828 A1 | 12/2010 | Bettcher et al. | |
| 2012/0015706 A1 | 1/2012 | Assad | |
| 2012/0164613 A1* | 6/2012 | Jung | G06Q 30/02 434/236 |
| 2013/0030889 A1* | 1/2013 | Davich | G06Q 30/02 705/14.14 |
| 2013/0085866 A1* | 4/2013 | Levitis | G06Q 30/0207 705/14.69 |
| 2013/0124282 A1* | 5/2013 | Hopwood | G06Q 30/0245 705/14.16 |
| 2013/0124300 A1* | 5/2013 | Hopwood | G06Q 30/0251 705/14.44 |
| 2013/0132959 A1* | 5/2013 | Moore | G06Q 50/01 718/100 |
| 2013/0138490 A1 | 5/2013 | Mosley et al. | |
| 2013/0205021 A1* | 8/2013 | Hall | H04W 24/08 709/224 |
| 2013/0339111 A1* | 12/2013 | Ross | G06Q 30/0241 705/14.12 |
| 2014/0213333 A1* | 7/2014 | Hanes | G07F 17/3218 463/9 |
| 2015/0186341 A1* | 7/2015 | Redol | G06F 17/2247 715/202 |
| 2016/0098787 A1 | 4/2016 | Caldwell | |
| 2016/0117887 A1 | 4/2016 | Berman | |
| 2017/0221314 A1 | 8/2017 | Locton | |
| 2017/0301179 A1* | 10/2017 | Palenzuela | G07F 17/3213 |
| 2018/0197575 A1* | 7/2018 | Doherty | G06Q 30/0276 |
| 2018/0254103 A1* | 9/2018 | Jung | G06N 3/088 |

* cited by examiner

WALLETS

Please select the wallet you wish to view:

[ ACME AUTO COMPANY ]

[ ABC SHOE COMPANY ]

[ SMITH BREWERY ]

INTERACTIVE ADVERTISING SYSTEM WITH TRACKING OF VIEWER'S ENGAGEMENT

BACKGROUND OF THE INVENTION

Field of the Invention

The present general inventive concept provides a method, apparatus, and computer readable storage medium directed to an interactive information presentation system.

Description of the Related Art

Sweepstakes and other contests have been available. For example, a fast food chain implemented a collection game in which random game pieces were distributed to customers who purchased goods, and when a customer collected a set of different game pieces, the customer would win a prize.

However, what is needed is a version of a sweepstakes game in which engagement with content can be measured and improved upon by adding interactive functionality to the content.

SUMMARY OF THE INVENTION

It is an aspect of the present invention to provide an improved interactive information presentation system.

This improved interactive information presentation system along with other aspects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 8 is a drawing of a selection screen for a plurality of wallets, according to an embodiment;

DESCRIPTION OF THE PREFERRED EMBODIMENTS

Figure 1:
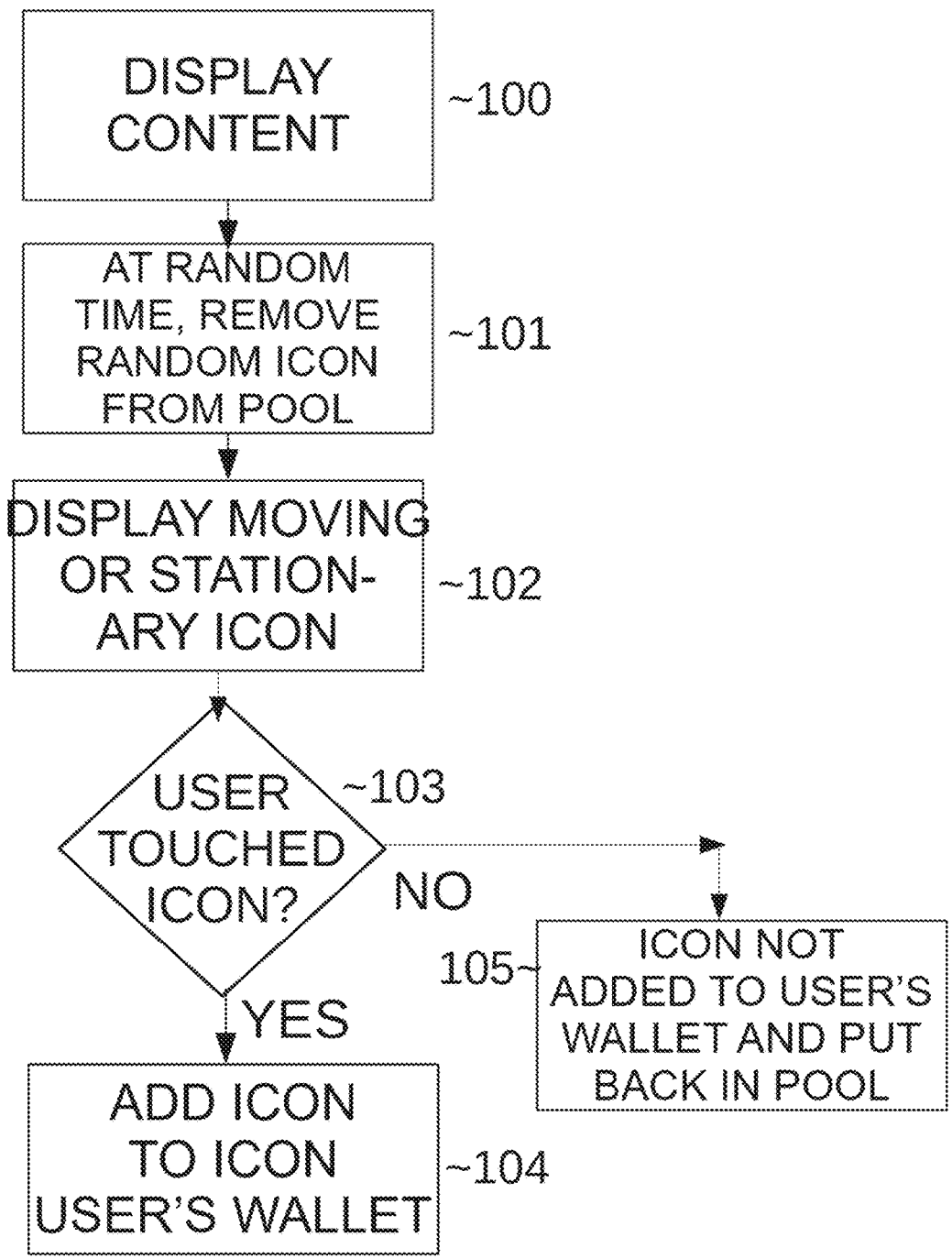
FIG. 1 is a flowchart illustrating an exemplary method of enabling a user to collect icons, according to an embodiment.

Reference will now be made in detail to the presently preferred embodiments of the invention, examples of which are illustrated in the accompanying drawings, wherein like reference numerals refer to like elements throughout.

The inventive concept relates to a method, system, and computer readable storage in which users watch/view content (e.g., advertisements, articles, or other content, whether video or static) on a digital display device (e.g., computer, cell phone, tablet, etc.) where an icon appears on the content. The icon can be moving or stationary. The user should touch, using a touch-screen, or click, with a mouse or other pointing device, the icon before the icon leaves the screen. The icon will only be displayed for a finite duration of time (e.g. 5 seconds). If the user is successful in touching the icon, the icon is added to the user's wallet. If the user can collect predefined combinations of icons, the user will be awarded a prize assigned to that combination.

FIG. 1 is a flowchart illustrating an exemplary method of enabling a user to collect icons, according to an embodiment.

In operation 100, content is displayed on an electronic output device associated with the user's computer, mobile phone, tablet, etc. The content can be a video (e.g., embedded inside a web page, or any other web site/platform), a web page, or any other type of content. The content is typically provided to users for free, although content can also be provided to users at a cost by means of a one-time payment or ongoing subscription.

From operation 100, the method proceeds to operation 101, which at a random time, removes an icon selected randomly from a pool. A pool is comprised of a finite quantity of each icon. As each icon is taken from the pool, the number of that respective icon decreases. At some point the number of particular icons in the pool may be very low or reach zero. At such a time, the pool may be restored to its full default quantities. Table I below illustrates a sample icon pool with its default quantities.

Note that many users would utilize the system/methods described herein and they would typically all share the same pool. Users typically will not know nor be shown the current composition (i.e. quantity of each remaining icon type) of the pool, but they may be shown the default state (i.e. default quantity of each icon type) of the pool.

TABLE I

| Icon Type | Quantity |
|---|---|
| Sedan | 10,000 |
| Minivan | 5,000 |
| SUV | 5,000 |
| Roadster | 1,000 |
| Pickup | 100 |
| Micro | 50 |

Figure 7A:
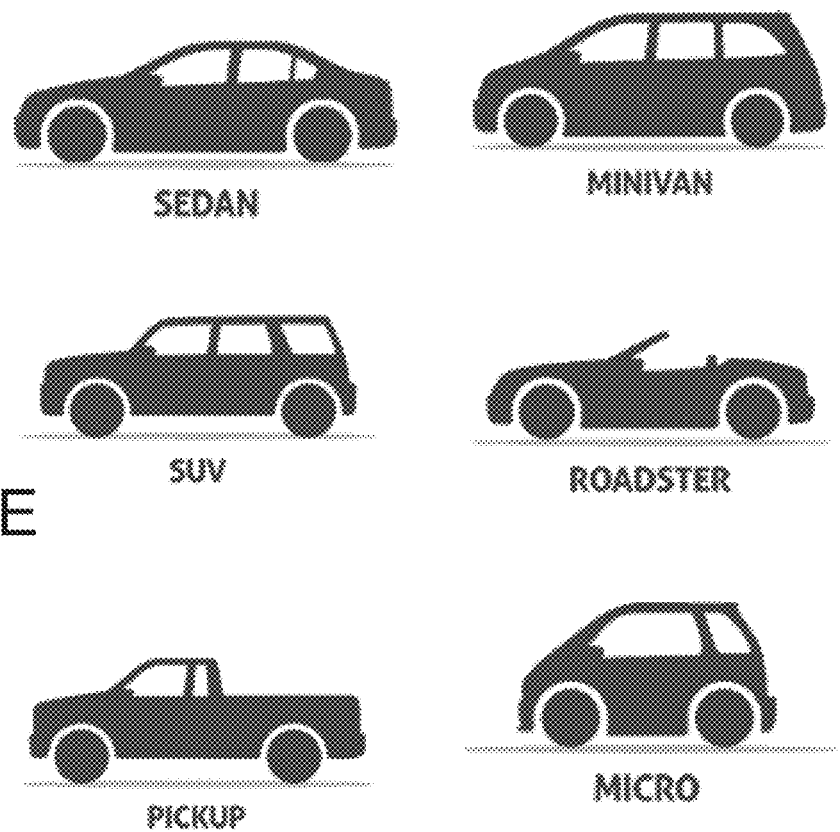
FIG. 7A is a drawing showing a collection of icons for a first company, according to an embodiment.

Thus, in the default state, the icon pool would have 10,000 sedan icons, 5,000 minivan icons, 5,000 SUV icons, 1,000 roadster icons, 100 pickup icons, and 50 micro icons (See FIG. 7A for a sample illustration of what these icons can look like). Note that this icon pool distribution is merely one example and of course other distributions of icon pools can be used as well (e.g., more/less icon types, different quantities of respective icons, different colors, sizes, etc.). Note that there is a relatively small number of micro icons (50), so as such, any winning combination which includes a micro icon would be difficult to achieve. Note that there can be sweepstakes periods, in which after the period is over the icon pool is reset to the default state. Note that in an embodiment, when the icon pool is reset to the default state, all of the icons for that company's wallets for all users are reset (i.e. all users' wallets for that company will be empty and have no icons). A sweepstakes period can be any duration of time, for example a day, a week, a month, etc. Thus, for example, each sweepstakes could last for a week, and at the end of each week (e.g. midnight each Sunday), the icon pool would reset to the default state, and all users' wallets would reset.

A random time means there can be a 1/X chance per second that the random icon would be removed from the random pool and the method continues to operation 102. X can be any value (e.g. 1 to 10,000 or more). Note that the time content is first displayed before the random icon appears is randomly determined and could be anywhere from 1 second to 15 minutes or more. It is also possible that due to the random nature of displaying icons, a particular content (e.g. a video) may not trigger the display of any icons on the screen before its conclusion. It is also possible that some content could have more than one icon displayed over it, but typically not at the same time. As one example, a 5-minute video could start playing, and one icon can appear and be displayed over the video, whether moving or stationary, starting at 2 minutes after the start of the video. The duration the icon would be displayed is 10 seconds, assuming the user does not select it earlier, and the video finishes playing with no further icons being displayed on it. If the random chance is not triggered, then the random icon is not removed from the pool and the method does not proceed to operation 101.

On occurrence of the random chance, a random icon is removed from the pool. When an icon is removed randomly from the pool, each icon in the pool has an equal chance of being removed.

Figure 2:
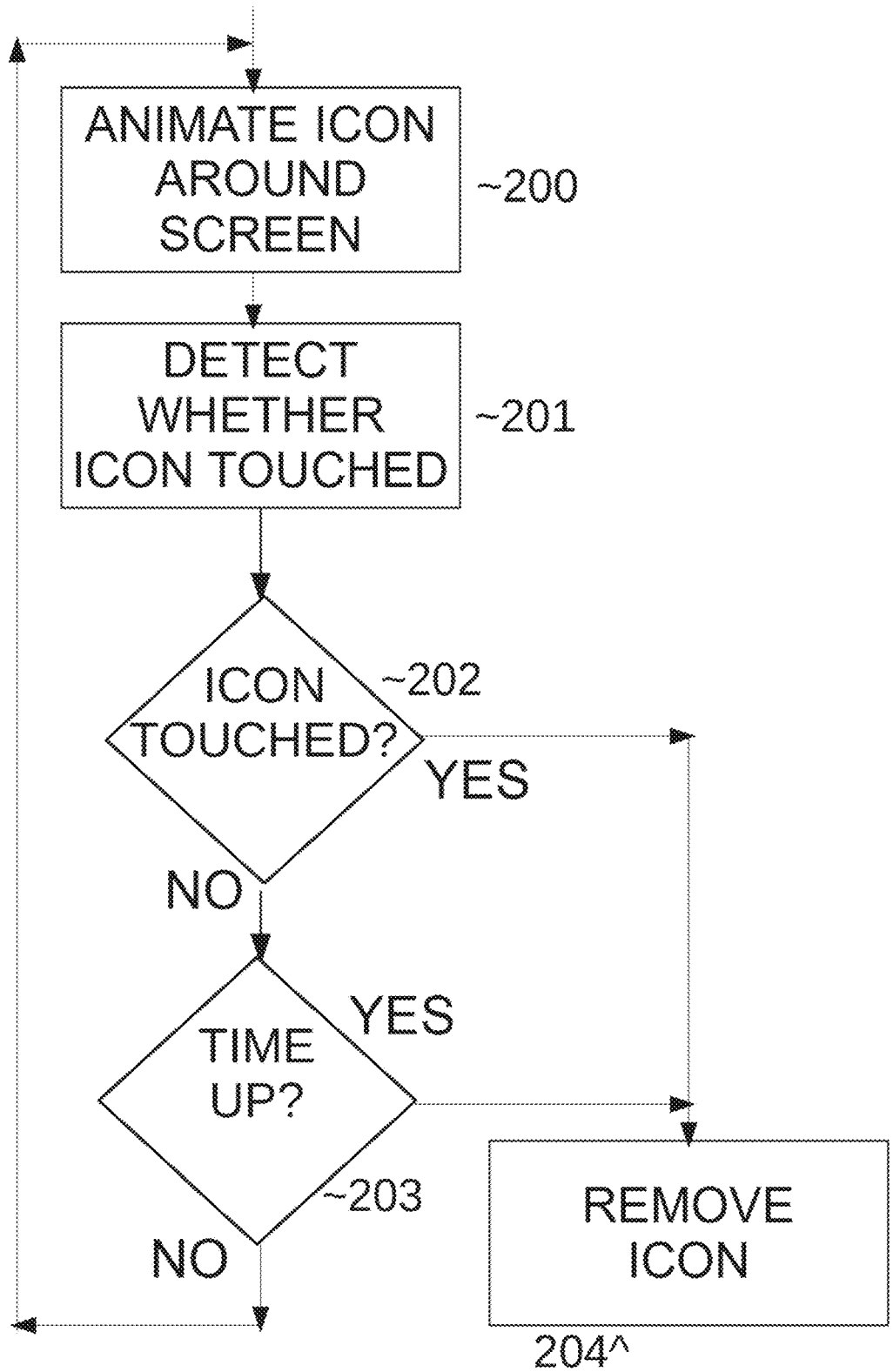
FIG. 2 is a flowchart illustrating an exemplary method of displaying a moving or stationary icon, according to an embodiment.

From operation 101, the method proceeds to operation 102 which displays the removed icon on the content being viewed (e.g., a video, a web page, a picture, etc.). The icon can be stationary or the icon can be moving across the screen using computer generated animation. FIG. 2 is a method illustrating in more detail the display of the moving or stationary icon, and the method shown in FIG. 2 is performed in operation 102. The icon is overlaid on the content (e.g., web page, image, video, etc.). In other words, the icon covers any image portions "behind" the icon so that the icon is always visible.

From operation 102, the method proceeds (after the method in FIG. 2 is implemented) to operation 103, which determines whether the user touched the icon during the time it was displayed.

If in operation 103, the user has not touched the icon, then the method proceeds to operation 105, wherein the icon is not added to the user's wallet and the icon is put back into the pool. Note that if multiple icon pools are being used then the icon is put back into the same pool that it was removed from (in operation 101).

If in operation 103, the user has successfully touched the icon, then the method proceeds to operation 104, wherein the icon is added to the user's wallet. The user's wallet is a collection of icons that the user has successfully touched and not yet redeemed. If the user has touched an icon that the user already possesses in his/her wallet, one of two operations is triggered: the icon is not added to the user's wallet because the user already has this icon, or the icon is added to the user's wallet and the user now has an increased quantity of this icon. For example, if the user already had 1 sedan icon the user would now have 2 sedan icons. In a further embodiment, in operation 101, if the random icon selected from the pool is an icon the user already possesses in his/her wallet, then this icon is not removed from the pool and additional random icons would be selected until one is selected that the user does not already have which is then removed from the pool. In this embodiment, the user would only see icons being displayed (in operation 102) that the user does not already possess.

FIG. 2 is a flowchart illustrating an exemplary method of displaying a moving or stationary icon, according to an embodiment. Operation 102 of FIG. 1 is illustrated in FIG. 2.

In operation 200, the computer animates the icon around the screen. The icon can move in one or more directions around the screen. In the case of a stationary icon, then operation 200 is not performed as the icon is displayed in a stationary position on the screen.

From operation 200, the method proceeds to operation 201, which continuously detects whether the icon is touched, with a finger using a touch-screen, or clicked, with a mouse or other pointing device using a computer, etc.

From operation 201, the method proceeds to operation 202, which determines whether the icon was selected (i.e. touched, clicked, etc.) If yes, then the method proceeds to operation 204, which removes the icon from the display and ends the method in FIG. 2, returning back to operation 103 in FIG. 1.

If in operation 202 it is determined that the icon was not touched, then the method proceeds to operation 203, which determines whether the duration of time to select an icon has expired. The icon will only be displayed for a finite duration of time (e.g. 3 to 60 seconds). The time at which the icon is displayed can be predetermined or random. If the duration of time has expired, meaning the time the icon has been displayed is greater than the finite duration of time, then the method proceeds to operation 204, which removes the icon from the display and ends the method in FIG. 2, returning back to operation 103 in FIG. 1.

If in operation 203, the duration of time the icon has been displayed is not greater than the finite duration of time, then the method proceeds to operation 200 which continues to display the icon either in a moving or stationary state.

Note that the point in time at which a particular icon appears on any displayed content on the electronic output device (operation 102/200), starts the finite duration of time, and the icon continues to appear until the duration of time has expired. In other words, each time an icon begins being displayed over content for a particular user, then the finite duration of time begins so it can be measured how long that icon has been displayed so it can be removed after the duration of time has expired.

When a user's wallet has enough icons (icon types) to form a predefined winning combination then the user gets a prize assigned to that combination. Table II is one example of a set of combinations and their respective prizes.

TABLE II

| Combination | prize |
| --- | --- |
| Blue sedan/red sedan/green sedan | $50 |
| Sedan (any color)/pickup (any color)/minivan (any color) | $500 |
| Any three yellow cars | $25 |
| All other combinations | no prize |

Note that if a particular icon the user has in his/her wallet can be used for more than one possible combination, then it will be applied to whatever combination the user currently can win. For example, in the example in Table II, if the user possessed only: a red sedan, green sedan and red SUV—the red sedan can be applied to any of the combinations using a red sedan (e.g. the first combination for $50 or the second combination for $500). If a particular icon the user has can form multiple combinations with the other icons the user's wallet already possesses, then the particular icon would be applied to the combination with the highest prize. If all of the icon types in the user's wallet do not form a winning combination, then of course the user does not win a prize, and the user may continue playing to add more icon types to his/her wallet.

In an embodiment, some winning combinations can include two of the same icon type. In this embodiment, the wallet would be required to accumulate more than one of the same icon type. For example, a winning combination can be three red pickups, in which the user would have to accumulate three red pickup icon types in his/her wallet in order to win a prize associated with this winning combination.

In a further embodiment, a winning combination can be every icon type that a company offers. A company can include any number of icon types in an icon pool (e.g. 3 to 10 or more). Winning combinations which are associated with a prize can include any number of icon types (e.g. 1 to 10 or more).

Figure 3:
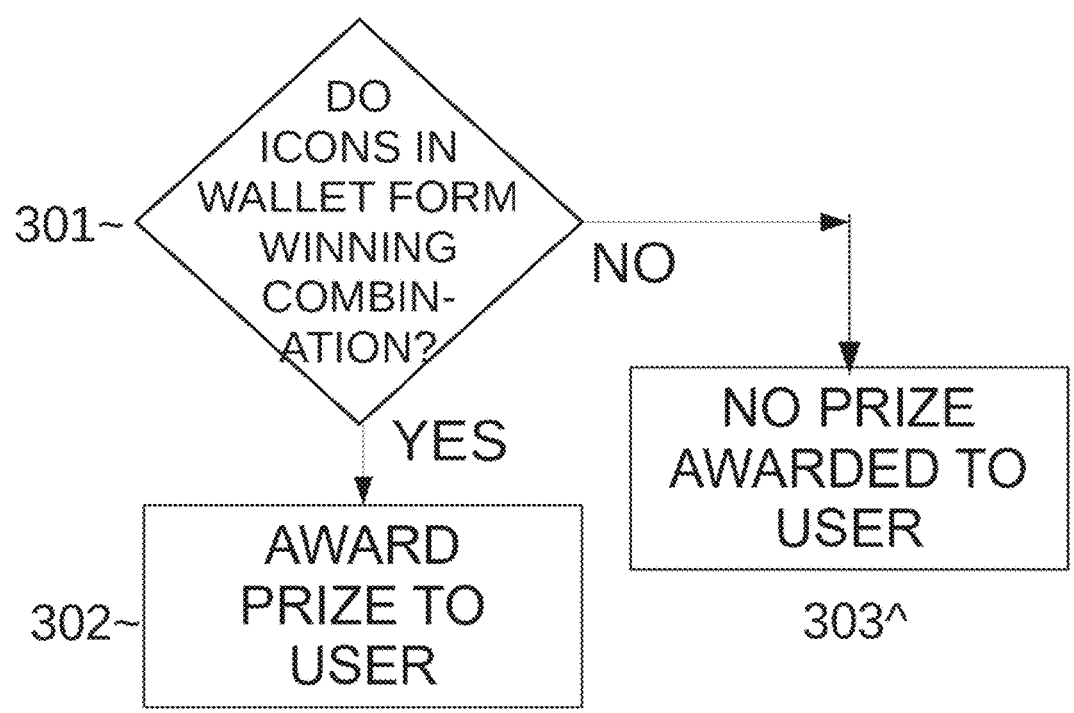
FIG. 3 is a flowchart illustrating an exemplary method of awarding prizes to a user, according to an embodiment.

FIG. 3 is a flowchart illustrating an exemplary method of awarding prizes to a user, according to an embodiment.

In operation 301, it is determined whether the icons in the user's wallet form a winning combination using predefined combinations such as that illustrated in Table II. If not, then the method proceeds to operation 303, in which no prize is awarded to the user.

If in operation 301, the icons in the user's wallet do form a winning combination, then the method proceeds to operation 302, which awards the prize to the user. If the prize is a monetary award, it can be electronically transferred to the user in a number of ways including an online payment provider such as PAYPAL, an electronic funds transfer, a check mailed to the user, etc. Note that a prize can also be a discount on a purchase of a product offered by the company sponsoring the advertisement. For example, ACME AUTO COMPANY could offer as a prize a $1,000 discount off any car they sell, and the discount can be delivered in numerous ways including a coupon code that the user can use when purchasing a car, a certificate for the discount that is electronically delivered to the user or mailed in the physical mail, etc. When a company sponsors content, such as an advertisement, this means that the content was created by or on behalf of the company and contains information related to one or more products sold by the company. Typically, when users view the content it benefits the sponsoring company (e.g. more sales of the product(s) described herein).

Once icons form a winning combination and the prize is awarded, those icons are removed from the user's wallet. These icons are not put back into the pool and are removed from circulation.

Note that a user can have multiple wallets (see FIG. 8), and each icon earned would go into the appropriate wallet, the wallet for the company that sponsors that particular icon. The system can accommodate numerous companies, each with their own set of icons. When a company sponsors icons, this means that the company created the respective icon image or it was created on behalf of the company. Typically, the company would pay the company maintaining the icon server, the company that implements the inventive concepts herein, for the privilege of participating in the distribution system described herein wherein the company's icons are displayed on content. The sponsor of icons (e.g., company X) can also typically sponsor content as well in which the company's sponsored icons will appear on, therefore increasing users' engagement of that content, therefore benefiting the company. In other words a company's sponsored icons can appear on content sponsored by the same company, although this is not required and it is possible that a company's sponsored icons can appear on content sponsored by a different company. Thus, the company that maintains the icon server itself is a business which can make money from companies who sponsor their icons, and the icon server and associated servers, systems, etc., could implement or cause to be implemented all of the features described herein. As used herein, if an icon is appearing/displayed then it is technically the icon's image that is being displayed which is associated with its icon type.

Figure 4:
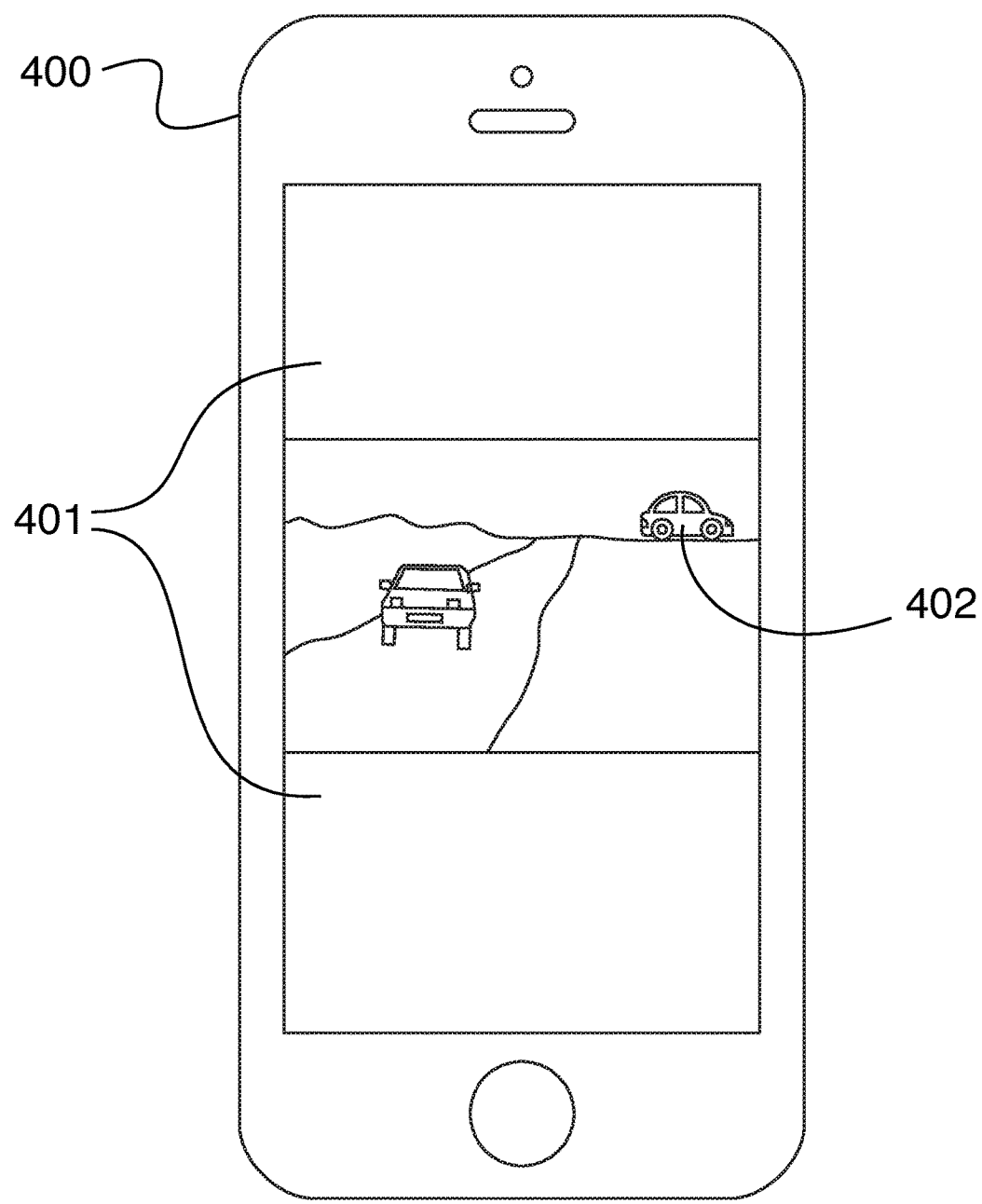
FIG. 4 is a drawing illustrating a mobile device displaying a static advertisement and an icon, according to an embodiment.

FIG. 4 is a drawing illustrating a mobile device displaying a static advertisement and an icon, according to an embodiment.

A mobile device 400 (e.g. a cell phone) displays content 401 which in this example is a static non-video image. An icon 402 is displayed over the image. The user will try to select (e.g. touch) the icon 402 before the icon 402 disappears. If the user successfully touches the icon 402 in time, then this icon type (red sedan) is added to the user's wallet.

Note that what is displayed is an icon image which corresponds to the icon type. The icon image is a digitally stored (e.g., JPG, BMP, etc.) visual image corresponding to the icon type. Each icon type will have a corresponding icon image. The word "icon" in this document refers in certain descriptions to icon type while in other descriptions the word "icon" refers to an individual icon image. Icon types can be stored by the computer as an identifier (e.g., a unique number, code, etc.)

While a cell phone is shown in FIG. 4, it is contemplated that any computing device can be used, such as a tablet, laptop computer, etc.

Figure 5:
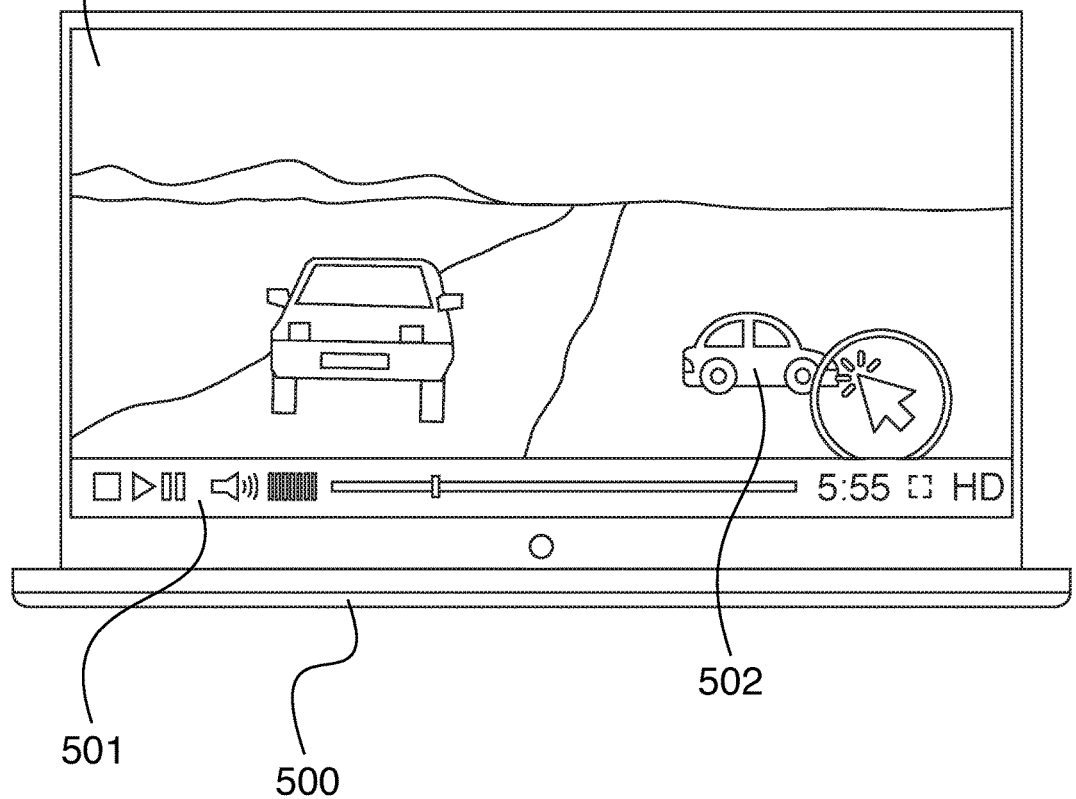
FIG. 5 is a drawing illustrating a personal computer displaying a video advertisement and an icon, according to an embodiment.

FIG. 5 is a drawing illustrating a personal computer displaying a video advertisement and an icon, according to an embodiment.

FIG. 5 is similar to FIG. 4, but the content is a video 501. The icon 502 moves around or can be stationary within the playing video until such icon is selected (e.g. clicked or touched by the user) or the duration of time expires. A laptop/notebook computer 500 is used by the user to watch the content (video 501).

Figure 6:
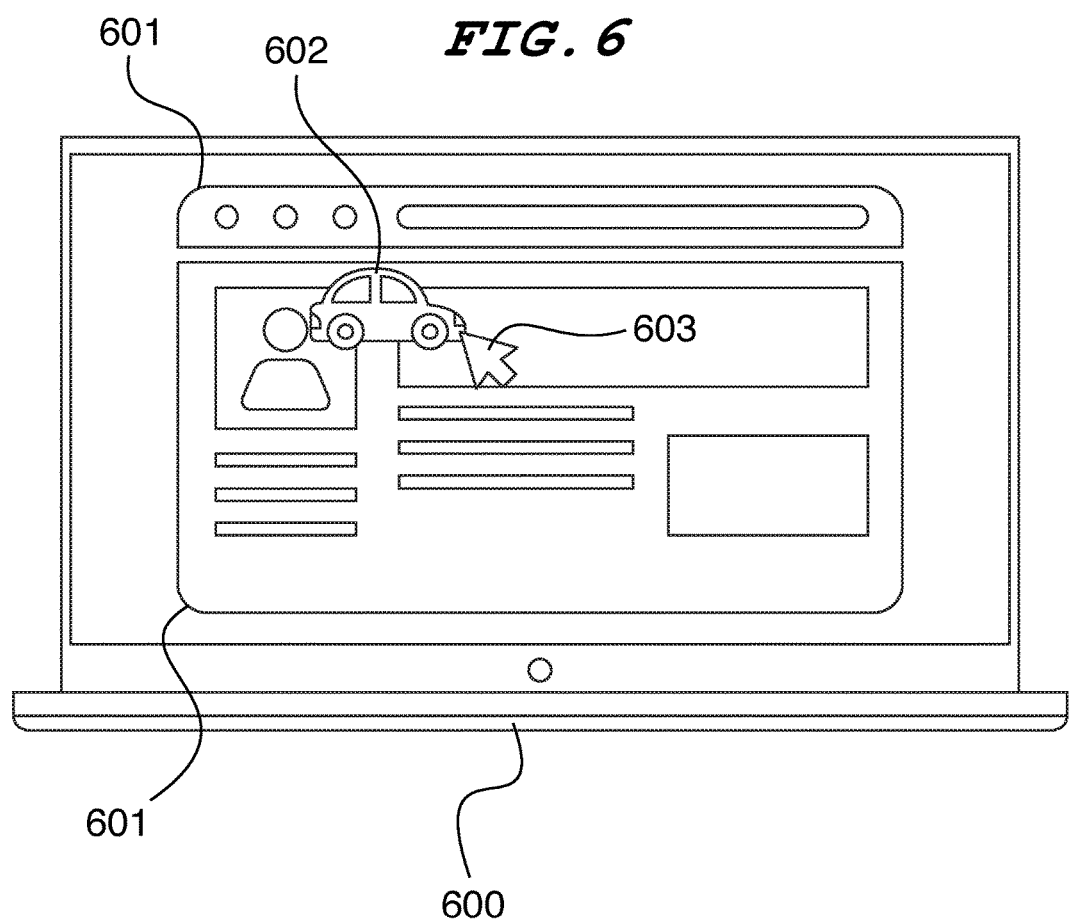
FIG. 6 is a drawing illustrating a personal computer displaying a web site and an icon, according to an embodiment.

FIG. 6 is a drawing illustrating a personal computer displaying a web site and an icon, according to an embodiment.

A computer is displaying a web site 601. An icon 602 is moving around and across the web page/site 601. The user is using a pointing device (e.g., mouse, touch-pad, etc.) to select the icon 602 with a cursor 603.

Note that in an "Intra-ad" embodiment, a company's icons would only be displayed on that company's advertisements/content. For example, a video ad for ACME AUTO COMPANY would only have icons associated with the ACME AUTO COMPANY (see FIGS. 5, 7A, 8 and Tables I and II) appear on the video ad as described herein. Other icons representing other companies (e.g. shoe icons for a shoe company unrelated to the ACME AUTO COMPANY) would not be displayed on the content (e.g., video ads, static content, etc.) for ACME AUTO COMPANY. In addition, static content for the ACME AUTO COMPANY could also have the icons for the ACME AUTO COMPANY appear anywhere on the web page as described herein. The static content for the ACME AUTO COMPANY can be, for example, the ACME AUTO COMPANY web site, an ad for the ACME AUTO COMPANY that appears on any other web site, etc. "Company" as used herein can also refer to a business entity, party, business, etc. This same notion of associated or representative content applies to any business entity, organization or party.

In a further embodiment, the icon image displayed over the content, video or non-video advertisement, would correspond to the same product that is the subject of the content. For example, if the content is an advertisement, video or static image, for an ACME minivan, then the only icon image displayed over that content would be the ACME minivan icon (see FIG. 7A) which corresponds to the ACME minivan icon type. As such, if the winning combination for a particular prize is sedan/pickup/minivan icon types, then the user would have to watch three videos or view three static advertisements, one for each type of car: a sedan (e.g. a video about the ACME sedan), a pickup (e.g. a video about the ACME pickup), and a minivan (e.g. a video about the ACME minivan). In this way the company, ACME, can encourage people to watch more of their advertisements or visit their corresponding web pages. Users would do this so in order to win more prizes.

In addition, in the "intra-ad" embodiment, content can have different types of icons from the same company. In other words, a content page/video for the ACME AUTO COMPANY could display any and all of the icons shown in FIG. 7A.

In another "intra-ad" embodiment, certain icons are only displayed on a particular content (e.g., web page, static ad, video, etc.). Each particular content has its own set of distinct icons which are not available when viewing other content (e.g., other ads, web pages, videos, etc.) For example, a video ad from ACME AUTO COMPANY for their sedan can have the following icon types: blue sedan, red sedan, green sedan, white sedan, black sedan. The winning combinations would only utilize these icon types. For example, a $750 discount off a new sedan from ACME AUTO COMPANY would require the following icon types to be in the user's wallet: red sedan, green sedan, white sedan. Only watching this particular content would enable the user to earn these icon types.

In an "intra-platform" embodiment, icons can be displayed across an entire platform and icons from different companies can all be mixed and displayed on the platform even though the particular content the user is viewing may not be associated with (sponsored by the same company as) the icon being displayed on that content. For example, a platform can be a website or application for a social media company, search engine, news site, etc. (e.g., FACEBOOK, YOUTUBE, etc.) Different companies (2 to 100 or more) can contract with the platform in order to utilize their sponsored icons, that is to display their icons from their own respective pools in order to enable the users to earn prizes. Thus, a user can be utilizing any aspect of the platform and see icons for (sponsored by) the ACME AUTO COMPANY, ACE BEVERAGE CORP., or any other company that is utilizing the platform for this purpose. The different icons sponsored from the different companies can appear on any of the platform's content in any order at random, even though icons from these companies may be unrelated. Such platforms can be utilized by a user by visiting a web site associated with that platform (e.g. by visiting a URL or by utilizing an app installed on a computing device.) For example, the same content can display a first icon that is sponsored by a first company and a second icon (different from the first icon) that is displayed at the same time (simultaneously) as the first icon or at a different time from when the first icon is displayed and sponsored by a second company (that is different from the first company); the content itself can be sponsored by the first company, the second company, or another company entirely. As another example, a first content on a platform can display a first icon sponsored by a first company, and a second content (that is different from the first content) on the platform can display a second icon (that is different from the first icon) and sponsored by a second company (the second company different form the first company); the first content can be sponsored by the first company or another company, and the second content can be sponsored by the second company or another company. "Icon" as used herein can refer to the moving or stationary icon that is displayed over content that a user is encouraged to select (as described herein).

Note that a platform can be a prize sponsor (e.g. ACME AUTO COMPANY web site or alternatively, any other website that hosts advertisements). For example, when a user visits a news web site, all content available on that site might be subject to the icon images being displayed and optionally moved across such content. Thus, the icon images can move across an entire web page and be visible regardless of what is "behind" the moving icon image.

In the "intra-platform" embodiment, a separate user wallet for each company utilizing the platform would be required. Note that there would be a large number of users (e.g., hundreds, thousands, millions, etc.) and each user would have his/her own set of wallets.

Note typically no more than one icon would appear on the content at any point in time. In fact, in all embodiments, icons would typically appear on the content sparingly, and would last for a short duration (e.g. 5 to 20 seconds), as to not distract the user.

FIG. 5 is an example of an "intra-ad" embodiment in that the icon (icon image) "a sedan" is the same as the type of advertisement video (an ACME AUTO COMPANY sedan).

FIG. 6 is an example of an "intra-platform" embodiment in that the platform, the web site, can be administered by a company independent of the icons being displayed. For example, the web site 601 being displayed can be a news web site which is unrelated to the icons (e.g. a sedan icon), the companies sponsoring the icons (e.g. ACME AUTO COMPANY), and their products, automobiles. On the same web site 601, icons shown in FIG. 7B can also be displayed which are associated with an entirely different company than ACME AUTO COMPANY and have no relation to that company or its products. Note that the icons from the ACE BEVERAGE CORP. (shown in FIG. 7B) cannot be mixed or combined with the icons from FIG. 7A or any other company's icons. Each company would have its own wallet for each user to store that company's own icons.

As described herein, a combination which awards a prize typically only includes icon types which are all sponsored by the same company. However, in a further embodiment, icon types from (sponsored by) one company can be mixed with icon types sponsored by another company in order to win a prize. For example, a platform might offer a relatively large prize or jackpot prize that requires the user to collect one of every icon type available on the platform (even though the icons are sponsored by multiple different companies).

FIG. 7A is a drawing showing a collection of icons for a first company, according to an embodiment.

Six different icons (icon types) are shown which are in the icon pool for this company. These icons are sponsored by the "ACME AUTO COMPANY." Of course, these are merely examples of how icons might look but they can be any shape/design. Icons can also be in different colors or just one color, and can come in different sizes or just one general size.

Figure 7B:
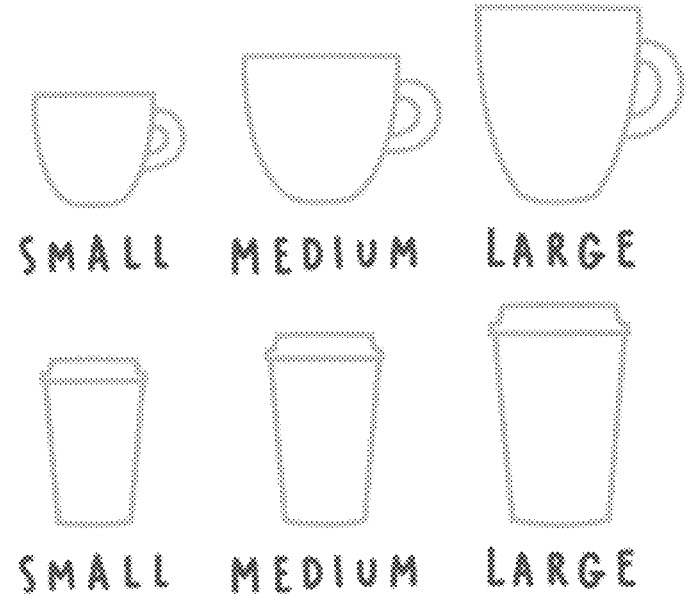
FIG. 7B is a drawing showing a collection of icons for a second company, according to an embodiment.

FIG. 7B is a drawing showing a collection of icons for a second company, according to an embodiment.

The icons shown in FIG. 7B can be for a different company than the icons shown in FIG. 7A. The icons shown in FIG. 7B can be, for example sponsored by a beverage company such as ACE BEVERAGE CORP (a different company from ACME AUTO COMPANY).

Different companies will have their own respective icons and prizes and their own associated wallets belonging to each user. A wallet is a collection of icons that the user earned, as described herein by touching the icon while it is still being displayed, and currently possesses. A wallet selection window can be used in order for a user to select which wallet he/she currently wishes to view.

In another embodiment, an icon can sometimes be a "mystery icon." The mystery icon can be, for example, a treasure chest, question mark, or other icon which does not reveal the actual icon that can be earned when the user touches the mystery icon. If the user is able to successfully touch the mystery icon before the duration of time expires, then it would change to an actual icon image and the user would see which icon he/she has obtained. If the user doesn't select it in time, then the mystery icon would disappear and the user would never know what icon would have been awarded had the user successfully touched the mystery icon.

FIG. 8 is a drawing of a selection window for a plurality of wallets, according to an embodiment.

A selection window 800 shows all of the available wallets, also referred to as icon wallets, for the particular user. The user would simply select (e.g., touch, click, etc.) the button corresponding to the icon wallet the user wishes to view. For example, if the user selects the "ACME AUTO COMPANY" button then the ACME AUTO COMPANY icon wallet as shown in FIG. 8 would then be displayed.

Figure 9:
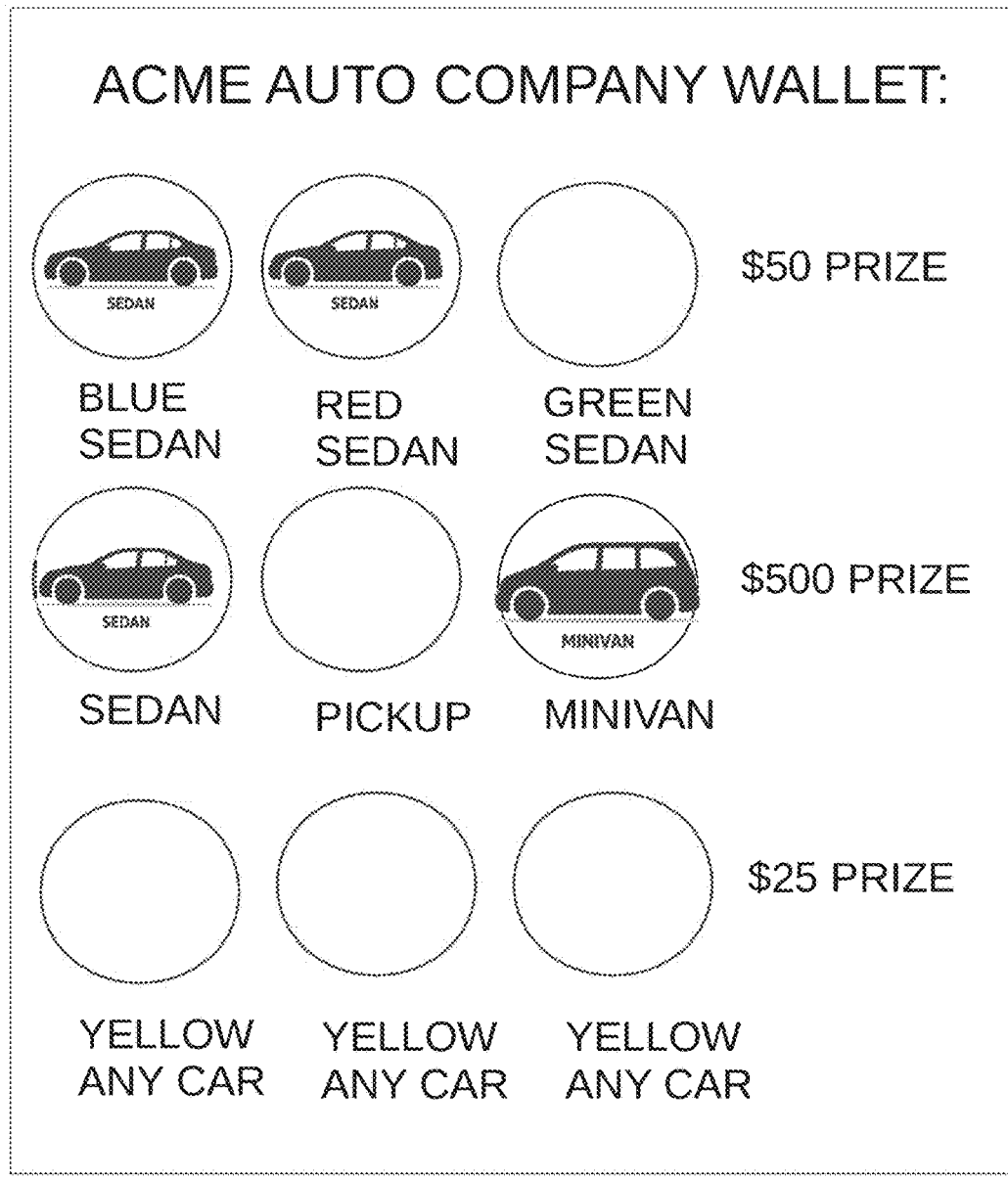
FIG. 9 is a drawing of a wallet screen, according to an embodiment.

FIG. 9 is a drawing of a wallet screen, according to an embodiment.

Shown are the possible winning combinations of icons from Table II, filled in with the icons that this user has earned. Note that if an icon can be used in multiple combinations, it can be filled in for any of them. For example, this user can have only one red sedan icon but the red sedan icon can appear in the first combination and the second combination since it could be used in either.

Once a winning combination is completely filled in then the corresponding prize is awarded to the user and all of the particular icons used to form that combination are removed and not put back into the pool.

The user may wish to periodically check each of his/her icon wallets in order to see how close he/she is to earning which prizes.

Typically, the ability for a user to utilize the methods/systems described herein is provided to each user for free. Note that in an embodiment, it may be necessary for the user to download a program or "app" on his/her computer/cell phone in order for the system to be able to execute code/programs that implement the functions described herein.

Figure 10:
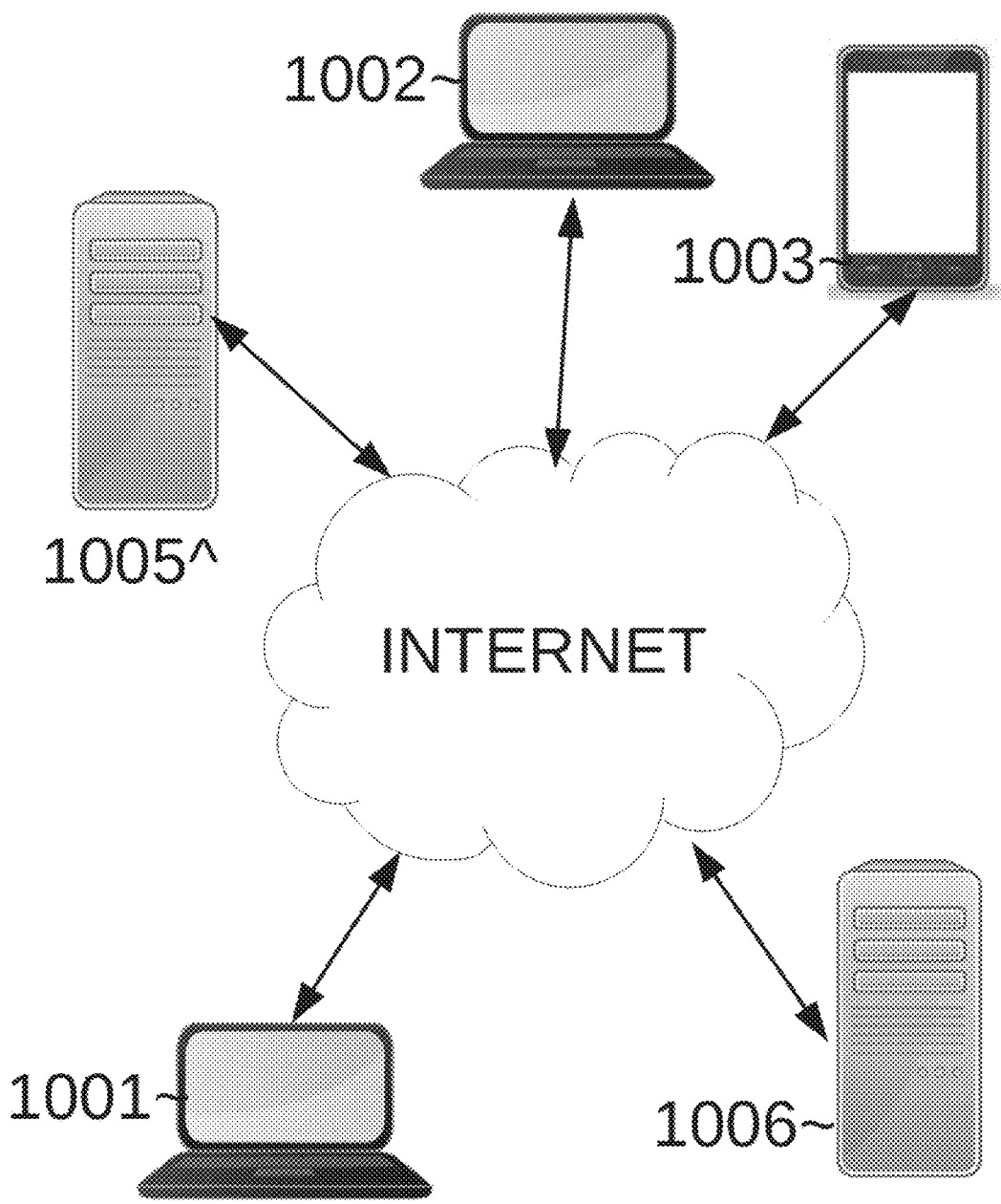
FIG. 10 is a network diagram illustrating participants of the system, according to an embodiment.

FIG. 10 is network diagram illustrating participants of the system, according to an embodiment.

Any number of remote computers 1001, 1002, 1003, etc., used by respective remote users, can be connected to the system via the Internet. The remote computers can be laptops, notebooks, tablets, cell phones, or any other such device which can connect to the Internet. Content server 1005 is a server/database that is connected to the Internet to send and receive content to the remote users on remote computers 1001, 1002, 1003. The content server 1005 can also serve/administer a platform. While only one content server 1005 is shown, it is contemplated that there can be a large number of content servers 1005 which all serve their respective content (e.g., videos, web pages, etc.) to the remote computers 1001, 1002, 1003. An icon server 1006 that is connected to the internet is utilized to administer all of the features described herein (e.g., maintaining the icon pools, choosing the icons to display, causing the icons to be displayed on the remote users' computers 1001, 1002, 1003, determining whether prizes are earned, awarding any earned prizes, maintaining icon wallets, and any other features described herein or needed for operation of the system/method). The icon server 1006 would work alongside the content server 1005. For example, the content server could be serving a video which is playing on a remote user's computer (e.g. 1001), and the icon server 1006 would also be in communication with the remote computer 1001 in order to cause all of the features described herein to occur (e.g., displaying icons on the remote computer's display, maintaining and displaying the icon wallets, awarding the prizes, etc.)

Note that the embodiments described herein provide for the improved tracking of engagement of content (e.g. advertisements). When a user touches an icon ("capture of an icon", as described herein) then it is confirmed that the user was indeed paying attention to the content. It is common that many internet users may have content up on their computer but are not engaged in it or are not viewing it at all. Each time a user captures an icon, that activity (e.g., the time/date the capture was made, the particular content, identification of user, etc.) is stored in a database (e.g. the icon server 1006) and tabulated. In this way, the engagement percentage (ads where an icon was captured divided by the total number of ads displayed) can be computed. Content/ads with a higher engagement percentage can be considered more effective than other content/ads which have a lower engagement percentage. The engagement statistics (e.g. number of engagements, times of engagements, etc.) for each content is stored in the database. Over a temporal period (e.g. a month) all of the content (e.g. advertisements) can be ranked based on their engagement percentage (i.e. the highest engagement percentage is ranked #1, the next highest is ranked #2, and so on). It can be assumed that content with a low engagement percentage is not being watched or watched at a relatively low volume. An icon capture can be considered a verified view of the content (e.g. advertisement).

As such, companies would desire to utilize the system described herein because it will increase the content (e.g. advertisements) engagement rate. Instead of passively watching content, content that now will display icons, or can potentially display icons, would have users paying close attention in order for them to make sure they capture the icon before the duration of time expires.

Figure 11:
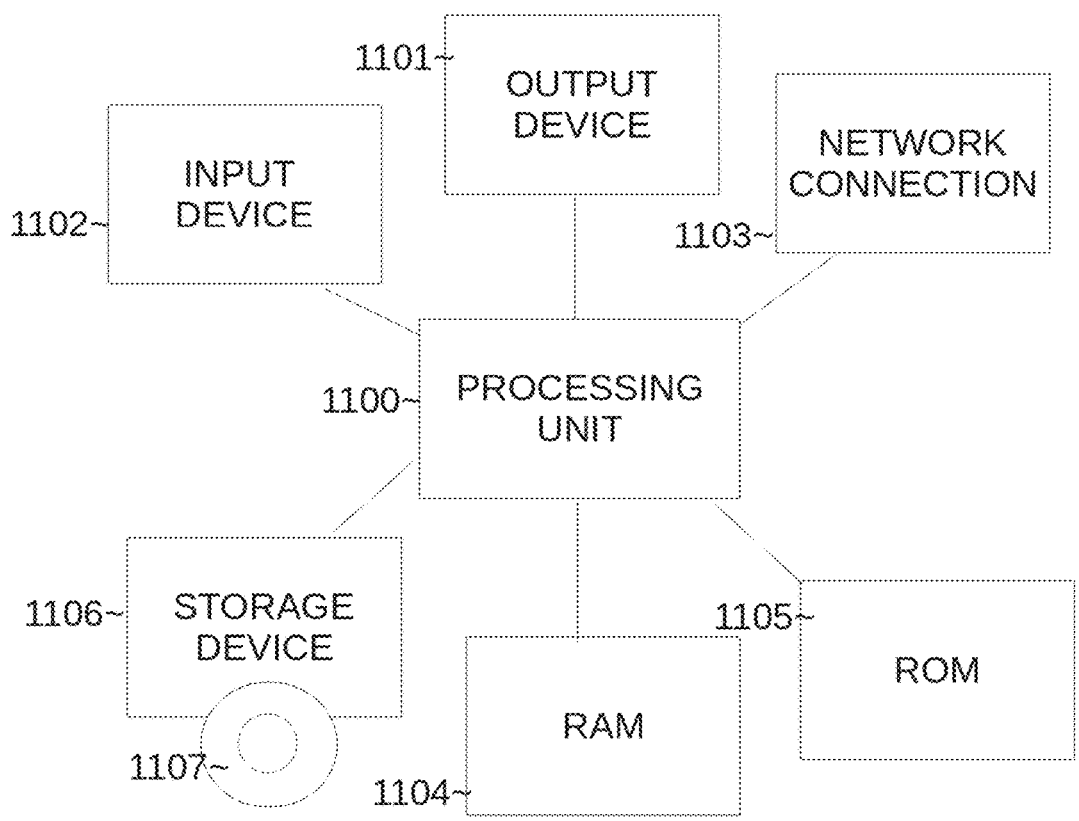
FIG. 11 is a block diagram illustrating an example of computer hardware which can be used to implement any computer utilized herein, according to an embodiment.

FIG. 11 is a block diagram illustrating an example of computer hardware which can be used to implement any computer utilized herein, according to an embodiment. The computer can also be any computing device, such as a cellular phone, tablet, server, database, personal computer, etc.

A processing unit 1100, such as a microprocessor and any associated components, is connected to an electronic output device 1101, such as an LCD monitor, touch screen, CRT, display, etc., which is used to display to the user any aspect/output/state of the method, and an input device 1102, such as buttons, a touch screen, a keyboard, mouse, etc., which can be used to input from the user any decision/input made by the user. All methods described herein can be performed by the processing unit 1100 by loading and executing respective instructions. Multiple such processing units can also work in collaboration with each other in the same or different physical location. The processing unit 1100 can also be connected to a network connection 1103, which can connect the processing unit 1100 to a computer communications network such as the Internet, a LAN, WAN, etc. The processing unit 1100 is also connected to a RAM 1104 and a ROM 1105. The processing unit 1100 is also connected to a storage device 1106 which can be a disk drive, DVD-drive, CD-ROM drive, flash memory, etc. A non-transitory computer readable storage medium 1107 (e.g., hard disk, CD-ROM, etc.), can store a program which can control the electronic device to perform any of the methods/features described herein and can be read by the storage device 1106. A program (e.g. an application or "app") can be executed by the processing unit 1100 in order to perform any of the methods/embodiments described herein. Such application can be downloaded from the internet by the processing unit 1100 via an online store (e.g. "app store" or "play store"). Any computer described herein can be utilized to implement the methods described herein, working individually or in conjunction with other computers.

While one processing unit is shown, it is contemplated that one or more such processors can work together in the same or different physical location to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.).

Note that the functionality to implement all of the features described herein should all be programmed on the "back end." That means that typically, each user would not need to download/install any programs, apps, etc., in order to experience the functionality described herein, although in an embodiment such download/installation can still be required. The web sites, platforms, viewers, can all be programmed using any available programming languages, protocols, etc., in order to implement all of the methods/features herein on the user's own computer (e.g., cell phone, tablet, laptop computer, personal computer, etc.) However, in an embodiment, it may be necessary for a user to download a code/program in order to enable all of the features described herein. This can be a "plug-in" which downloads and installs into a user's browser, an app which can be installed on a cell phone or personal computer or a program that installs on a computer/cell phone, etc. This program would have code which would instruct the user/s computer/browser to perform all of the features described herein.

Note that a user can also login to the system as well (e.g. into an account maintained by the icon server 1006 or other server). The icon server 1006 can maintain a unique user account for each user, and this account would store all of the user's wallets and all other information known about the user (e.g. his/her successful captures of icons, etc.) When the user installs the plug-in or app, the user can enter identifying information (e.g., email address, username, password, etc.).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:

executing computer readable instructions on at least one processor, which causes the following operations:

maintaining a pool of a plurality of icon types and their respective quantities, the pool being shared by a plurality of users, wherein each of the plurality of icon types has a corresponding icon image;

maintaining a plurality of wallets for the plurality of users, wherein each user of the plurality of users has at least one wallet of the plurality of wallets, wherein each wallet out of the plurality of wallets stores a set of icon types out of the plurality of icon types and respective quantities of each of the icon types in the set of icon types;

selecting an icon type out of the plurality of icon types, wherein the icon type is selected at random from the pool;

displaying an icon image corresponding to the icon type over content being displayed on an electronic output device on a computer used by a user, the content being a video and starting a finite period of an amount of time;

enabling the user to select the icon image by touch or click only before the finite period runs out;

providing functionality in the computer readable instructions that comprises once the finite period runs out and the icon image is not touched or clicked the icon image is removed from the content and there is no initiation of any awarding an award responsive to the icon image that was removed and no change in play of the video;

receiving a touch or click of the icon image by the user before the finite period has run out;

in response to the receiving the touch or click, removing the icon image displayed over the content and adding the icon type to a wallet for the user;

determining that the wallet for the user comprises a predefined combination of icon types out of the plurality of icon types; and based on the determining, awarding the user a prize corresponding to the predefined combination, wherein after the icon type is selected and the touch or click of the icon image by the user is received before the finite period has run out, then a quantity of the icon type in the pool is decreased.

2. The method as recited in claim 1, wherein the content is an advertisement.

3. The method as recited in claim 1, wherein the content is on a web page.

4. The method as recited in claim 1, wherein the electronic output device is a touch screen.

5. The method as recited in claim 1, wherein the icon type is sponsored by a company who sponsors the content.

6. The method as recited in claim 1, after a predetermined period of time, resetting the pool to default quantities of icon types out of the plurality of icon types and removing all icon types out of the plurality of icon types from the wallet for the user.

7. The method as recited in claim 1, wherein the displaying the icon image displays the icon image moving over the content.

8. The method as recited in claim 1, wherein the content is displayed by a platform which also displays a second icon image over the content, the second icon image corresponding to a second icon type which is sponsored by a different company than the icon type.

9. The method as recited in claim 1, further comprising storing an amount of captures of the icon image for the content.

10. An apparatus, comprising:
at least one server connected to the internet, the at least one server connected to at least one computer readable storage storing computer readable instructions, the computer readable instructions programmed to cause the at least one server to perform:
maintain a pool of a plurality of icon types and their respective quantities, the pool being shared by a plurality of users, wherein each of the plurality of icon types has a corresponding icon image;
maintain a plurality of wallets for the plurality of users, wherein each user of the plurality of users has at least one wallet of the plurality of wallets, wherein each wallet out of the plurality of wallets stores a set of icon types out of the plurality of icon types and respective quantities of each of the icon types in the set of icon types;
select an icon type out of the plurality of icon types, wherein the icon type is selected at random from the pool;
display an icon image corresponding to the icon type over content being displayed on an electronic output device on a computer used by a user, wherein the content is a video, and start a finite period of an amount of time;
enable the user to select the icon image by touch or click only before the finite period expires, and if the user selects the icon image by touch or click before the finite period expires then remove the icon image and add the icon type to a wallet for the user, but if the user does not select the icon image by touch or click before the finite period expires then the icon image is removed from the content and there is no initiation of any awarding an award responsive to the icon image that was removed and no change in play of the video; and
determine whether the wallet for the user comprises a predefined combination of icon types out of the plurality of icon types and if the wallet for the user comprises a predefined combination of icon types out of the plurality of icon types then award the user a prize corresponding to the predefined combination,
wherein after the icon type is selected and the user selected the icon image by touch or click before the finite period expired then a quantity of the icon type in the pool is decreased.

11. The apparatus as recited in claim 10, wherein the computer readable instructions are further configured such that the content is an advertisement.

12. The apparatus as recited in claim 10, wherein the computer readable instructions are further configured such that the content is on a web page.

13. The apparatus as recited in claim 10, wherein the computer readable instructions are further configured such that selection of the icon image by the user comprises the user only touching the icon image.

14. The apparatus as recited in claim 10, wherein the computer readable instructions are further configured such that the icon type is sponsored by a company who sponsors the content.

15. The apparatus as recited in claim 10, wherein the computer readable instructions are further configured such that after a predetermined period of time, the pool is reset to default quantities of icon types out of the plurality of icon types and all icon types out of the plurality of icon types are removed from the wallet for the user.

16. The apparatus as recited in claim 10, wherein the computer readable instructions are further programmed to cause the at least one server to further perform: display the icon image moving over the content.

17. The apparatus as recited in claim 10, wherein the computer readable instructions are further programmed to cause display of a second icon image over the content, the second icon image corresponding to a second icon type which is sponsored by a different company than the icon type.

18. The apparatus as recited in claim 10, wherein the computer readable instructions are further programmed to cause the at least one server to store an amount of captures of the icon image for the content.

* * * * *